United States Patent
Kang

(10) Patent No.: US 9,565,033 B2
(45) Date of Patent: Feb. 7, 2017

(54) MULTICAST PROCESSING METHOD, APPARATUS AND SYSTEM

(71) Applicant: Huawei Technologies Co., Ltd., Shenzhen (CN)

(72) Inventor: Yudong Kang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 14/702,306

(22) Filed: May 1, 2015

(65) Prior Publication Data

US 2015/0236871 A1    Aug. 20, 2015

Related U.S. Application Data

(63) Continuation of application No. PCT/CN2013/075566, filed on May 13, 2013.

(30) Foreign Application Priority Data

Nov. 2, 2012  (CN) .......................... 2012 1 0433236

(51) Int. Cl.
    *H04L 12/46*    (2006.01)
    *H04L 12/18*    (2006.01)
(52) U.S. Cl.
    CPC ........... *H04L 12/4633* (2013.01); *H04L 12/18* (2013.01); *H04L 12/4675* (2013.01)
(58) Field of Classification Search
    CPC .. H04L 12/4633; H04L 12/4641; H04L 12/18; H04L 12/4675; H04L 45/64; H04L 45/66
    (Continued)

(56) References Cited

U.S. PATENT DOCUMENTS

2004/0125803 A1    7/2004  Sangroniz et al.
2012/0281697 A1*  11/2012  Huang ..................... H04L 45/16
                                                                370/390
(Continued)

FOREIGN PATENT DOCUMENTS

CN        1889448 A      1/2007
CN      101013950 A      8/2007
(Continued)

OTHER PUBLICATIONS

Mahalingam, M., et al., "VXLAN: A Framework for Overlaying Virtualized Layer 2 Networks over Layer 3 Networks," draft-mahalingam-dutt-dcops-vxlan-02.txt, Aug. 22, 2012, 22 pages.

(Continued)

*Primary Examiner* — Afsar M Qureshi
(74) *Attorney, Agent, or Firm* — Conley Rose, P.C.

(57) ABSTRACT

A multicast processing method, apparatus and system. A Virtual eXtensible Local Area Network (VXLAN) tunnel end point (VTEP) receives configuration information sent by a management layer; and receives a multicast packet sent by a VM managed by the VTEP; when performing VXLAN encapsulation on the multicast packet after determining that the virtual machine (VM) matches the VM tenant identifier, the VTEP encapsulates a destination address of the multicast packet into the multicast address on a layer 3 network according to a mapping relationship between a VM multicast address and a multicast address on the layer 3 network, and encapsulates a VXLAN source address of the multicast packet into a layer 3 network multicast source address according to a mapping relationship between a VM multicast source address and a layer 3 network multicast source address; and sends an encapsulated multicast packet to the layer 3 network.

15 Claims, 5 Drawing Sheets

(58) Field of Classification Search
USPC .......................................................... 370/390
See application file for complete search history.

(56) References Cited

U.S. PATENT DOCUMENTS

| | | | | |
|---|---|---|---|---|
| 2013/0311637 | A1* | 11/2013 | Kamath | H04L 29/08576 709/224 |
| 2014/0052831 | A1* | 2/2014 | Wijnands | H04L 61/25 709/220 |
| 2014/0059537 | A1* | 2/2014 | Kamble | G06F 9/45558 718/1 |
| 2014/0071983 | A1* | 3/2014 | Banavalikar | H04L 45/72 370/389 |
| 2014/0233563 | A1* | 8/2014 | Chen | H04L 12/18 370/390 |

FOREIGN PATENT DOCUMENTS

| | | | |
|---|---|---|---|
| CN | 101374069 | A | 2/2009 |
| CN | 102215172 | A | 10/2011 |

OTHER PUBLICATIONS

Foreign Communication From a Counterpart Application, European Application No. 13852327.9, Extended European Search Report dated Sep. 28, 2015, 8 pages.

Nakagawa, Y., et al., "A Management Method of IP Multicast in Overlay Networks using OpenFlow," HotSDN'12, Proceedings of the first workshop on Hot topics in software defined networks, Aug. 13, 2012, pp. 91-96.

Foreign Communication From a Counterpart Application, PCT Application No. PCT/CN2013/075566, English Translation of International Search Report dated Aug. 15, 2013, 2 pages.

Foreign Communication From a Counterpart Application, PCT Application No. PCT/CN2013/075566, English Translation of Written Opinion dated Aug. 15, 2013, 9 pages.

Foreign Communication From a Counterpart Application, Chinese Application No. 201210433236.5, Chinese Office Action dated Jun. 3, 2016, 5 pages.

\* cited by examiner

MULTICAST PROCESSING METHOD, APPARATUS AND SYSTEM

CROSS-REFERENCE TO RELATED APPLICATION

This application is a continuation of International Application No. PCT/CN2013/075566, filed on May 13, 2013, which claims priority to Chinese Patent Application No. 201210433236.5, filed on Nov. 2, 2012, both of which are incorporated herein by reference in their entireties.

TECHNICAL FIELD

The present disclosure relates to the field of communications, and in particular, to a multicast processing method, apparatus and system on a Virtual eXtensible Local Area Network (VXLAN).

BACKGROUND

A VXLAN is a hotspot in network virtualization research and can establish a logical network (or an extended Virtual Local Area Network (VLAN)) on a physical network, and support implementation of long-distance virtual machine (VM) migration between geographically dispersed data centers. The VXLAN can finally provide long-distance segmentation support required by a multi-tenant cloud network. The VXLAN mainly solves a problem of tenants isolation in the data centers. In an existing isolation method, VLANs are generally used for isolation, but there are only 4096 VLANs, which cannot satisfy a requirement of isolating multiple tenants in the data centers. A VXLAN standard uses a 24-bit identifier named VXLAN network identifier (VNI). A maximum of 16 million VNIs can be defined in each management domain, and it is ensured that client data is isolated, because only VMs running with a same VNI can perform communication.

FIG. 1 shows a schematic networking diagram of a VXLAN according to the prior art, where multiple virtual VMs are made on servers in FIG. 1. The servers support a VXLAN tunnel end point (VTEP) function, where VNI22 is a network identifier of the VXLAN and allocated to a tenant, VMs of the tenant are distributed on SERVER1, SERVER3, SERVER4, and SERVER5, and there is no VM of the tenant on SERVER2 and SERVER6. When VM1-1 needs to communicate with VM5-1, the VM1-1 sends an Address Resolution Protocol (ARP) request packet, where the ARP request packet is first sent to VTEP1. When the VTEP1 does not learn an address of the VM5-1, the VTEP1 encapsulates the ARP request packet into a VXLAN broadcast packet, and broadcasts the VXLAN broadcast packet on a layer 3 network, where a used broadcast address is a layer 3 multicast address corresponding to the VNI22. If a server on which a VTEP is located does not have the tenant with the VNI22, this VTEP does not receive this broadcast packet, while a VTEP on a server that has a tenant with the VNI22 receives this broadcast packet. For example, VTEP5 on the SERVER5 receives this broadcast packet, and then, the VTEP5 removes a VXLAN header from the broadcast packet to obtain the ARP packet, and broadcasts the ARP packet to all VMs on the SERVER5. Because a target of the ARP packet is the VM5-1, only the VM5-1 responds to the ARP request packet, and no VM on another VTEP responds to the ARP request packet. An ARP response packet sent by the VM5-1 is also encapsulated into a VXLAN packet on the VTEP5. The VTEP5 sends an encapsulated VXLAN packet to the VTEP1, the VTEP1 removes a VXLAN header to obtain the ARP response packet and sends the ARP response packet to the VM1-1. In addition, the VETP1 performs ARP learning, and generates a corresponding ARP entry, so as to ensure subsequent communication between the VM1-1 and the VM5-1.

A management layer of the VXLAN allocates a fixed IP address and a fixed layer 3 multicast address to each VTEP, and the fixed IP address or layer 3 multicast address is used when a VXLAN unicast packet or multicast packet is encapsulated. However, such allocation is inapplicable to some application scenarios of VM multicast, and has the following deficiency:

The existing VXLAN does not support a multicast source selection function of the Internet Group Management Protocol version 3 (IGMPv3). A significant feature of the IGMPv3 is the multicast source selection function, that is, a client can select a multicast source according to requirements of the client. However, in the existing VXLAN technology, only one IP address and one or more multicast addresses are allocated to a VTEP. When processing multicast packets, the VTEP encapsulates all the multicast packets into VXLAN packets using a same multicast address, and a unicast address of the VTEP is used as a source address of a VXLAN packet. When multiple multicast sources are on a same SERVER, and the multicast sources and a client that sends a multicast request are not on a same SERVER, a VTEP of the SERVER on which the multicast sources are located cannot differentiate, according to the received VXLAN packet, which multicast source on the SERVER is requested by the client. As a result, the multicast client cannot receive a multicast packet sent by a selected multicast source.

SUMMARY

An objective of embodiments of the present disclosure is to provide a multicast processing method, apparatus and system in a VXLAN environment, so as to solve a problem in the prior art that a multicast client cannot correctly select a multicast resource.

According to one aspect, the present disclosure provides a multicast processing method, where the method includes receiving, by a VXLAN tunnel end point VTEP, configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address; and receiving, by the VTEP, a multicast packet sent by a VM managed by the VTEP; when performing VXLAN encapsulation on the multicast packet after determining that the VM matches the VM tenant identifier, encapsulating, according to the mapping relationship between the VM multicast address and the multicast address on the layer 3 network, a destination address of the multicast packet into the multicast address on the layer 3 network, and encapsulating, according to the mapping relationship between the VM multicast source address and the layer 3 network multicast source address, a VXLAN source address of the multicast packet into the layer 3 network multicast source address; and sending an encapsulated multicast packet to the layer 3 network.

Optionally, the method further includes receiving, by the VTEP, a multicast data packet sent by the VM managed by the VTEP; when performing VXLAN encapsulation on the multicast data packet after determining that the VM matches the VM tenant identifier, encapsulating, according to the mapping relationship between the VM multicast address and the multicast address on the layer 3 network, a destination address of the multicast data packet into the multicast address on the layer 3 network, and encapsulating, according to the mapping relationship between the VM multicast source address and the layer 3 network multicast source address, a VXLAN source address of the multicast data packet into the layer 3 network multicast source address; and sending an encapsulated multicast data packet to the layer 3 network.

Optionally, after the sending an encapsulated multicast data packet to the layer 3 network, the method further includes when a multicast service ends, receiving, by the VTEP, a deletion command for the configuration information and sent by the management layer, and deleting the configuration information according to the deletion command.

According to another aspect, a multicast processing method is provided, where the method includes receiving, by a virtual extensible local area network VXLAN tunnel end point VTEP, configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address; receiving, by the VTEP, an IGMPv3 packet for joining VM multicast and sent by a VM managed by the VTEP, where the IGMPv3 packet carries the VM multicast address and the VM multicast source address; and when the VTEP determines that the VM matches the VM tenant identifier, modifying, according to the mapping relationship between the VM multicast address and the multicast address on the layer 3 network, the VM multicast address in the IGMPv3 packet into the multicast address on the layer 3 network, modifying, according to the mapping relationship between the VM multicast source address and the layer 3 network multicast source address, the multicast source address in the IGMPv3 packet into the multicast source address on the layer 3 network, and sending a modified IGMPv3 packet to the layer 3 network.

Optionally, the method further includes receiving, by the VTEP, a multicast data packet that is sent by another VTEP on the VXLAN using the layer 3 network, where a source address of the multicast data packet is the multicast source address on the layer 3 network, and a destination address is the multicast address on the layer 3 network; and decapsulating, by the VTEP according to the configuration information, the multicast data packet to acquire data in the multicast data packet, and sending the data in the multicast data packet to the VM.

Optionally, after the sending the data in the multicast data packet to the VM, the method further includes when a multicast service ends, receiving, by the VTEP, a deletion command for the configuration information and sent by the management layer, and deleting the configuration information according to the deletion command.

According to still another aspect, a multicast processing apparatus is provided, where the multicast processing apparatus includes a receiving unit configured to receive configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address, where the receiving unit is further configured to receive a multicast packet sent by a VM managed by the multicast processing apparatus; an encapsulation unit configured to, when performing VXLAN encapsulation on the multicast packet after determining that the VM matches the VM tenant identifier, encapsulate, according to the mapping relationship between the VM multicast address and the multicast address on the layer 3 network and acquired from the receiving unit, a destination address of the multicast packet into the multicast address on the layer 3 network, and encapsulate, according to the mapping relationship between the VM multicast source address and the layer 3 network multicast source address and acquired from the receiving unit, a VXLAN source address of the multicast packet into the layer 3 network multicast source address; and a sending unit configured to send, to the layer 3 network, an encapsulated multicast packet acquired from the encapsulation unit.

Optionally, the receiving unit is further configured to receive a multicast data packet sent by the VM managed by the multicast processing apparatus; the encapsulation unit is further configured to, when performing VXLAN encapsulation on the multicast data packet after determining that the VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the layer 3 network multicast source address; and the sending unit is further configured to send, to the layer 3 network, an encapsulated multicast data packet acquired from the encapsulation unit.

Optionally, the apparatus further includes a deletion unit configured to, when a multicast service ends, receive a deletion command for the configuration information and sent by the management layer, and delete the configuration information according to the deletion command.

According to yet another aspect, a multicast processing apparatus is provided, where the apparatus includes a receiving unit configured to receive configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address, where the receiving unit is further configured to receive an IGMPv3 packet for joining VM multicast and sent by a VM managed by the multicast processing apparatus, where the IGMPv3 packet carries the VM multicast address and the VM multicast source address; a modification unit configured to, when determining that the VM matches the VM tenant identifier, modify, according to the mapping relationship between the VM multicast address and the multicast address on the layer 3 network and acquired from the receiving unit, the VM multicast address in the IGMPv3 packet into the multicast address on the layer 3 network, and modify, according to the mapping relationship between the VM multicast source address and the layer 3 network multicast source address and acquired from the receiving unit, the multicast source address in the IGMPv3 packet into the multicast source address on the layer 3 network; and a sending unit configured to send, to the layer 3 network, a modified IGMPv3 packet acquired from the modification unit.

Optionally, the receiving unit is further configured to receive a multicast data packet that is sent by another multicast processing apparatus on a VXLAN using the layer 3 network, where a source address of the multicast data packet is the multicast source address on the layer 3 network, and a destination address is the multicast address on the layer 3 network; the apparatus further includes a decapsulation unit configured to decapsulate, according to the configuration information, the multicast data packet acquired from the receiving unit to acquire data in the multicast data packet; where the sending unit is further configured to send, to the VM, the data in the multicast data packet and acquired from the decapsulation unit.

Optionally, the apparatus further includes a deletion unit configured to, when a multicast service ends, receive a deletion command for the configuration information and sent by the management layer, and delete the configuration information according to the deletion command.

According to a last aspect, a multicast processing system is provided, where the system includes a VTEP on a multicast source side, a VTEP on a multicast receive side, and a management layer, where the VTEP on the multicast source side and the VTEP on the multicast receive side are configured to separately receive configuration information sent by the management layer, where the configuration information includes a VM tenant identifier, a mapping relationship between a VM multicast address and a multicast address on a layer 3 network, and a mapping relationship between a VM multicast source address and a layer 3 network multicast source address; the VTEP on the multicast source side is further configured to receive a multicast packet sent by a first VM managed by the VTEP on the multicast source side; when performing VXLAN encapsulation on the multicast packet after determining that the first VM matches the VM tenant identifier, encapsulate, according to the mapping relationship between the VM multicast address and the multicast address on the layer 3 network, a destination address of the multicast packet into the multicast address on the layer 3 network, and encapsulate, according to the mapping relationship between the VM multicast source address and the layer 3 network multicast source address, a VXLAN source address of the multicast packet into the layer 3 network multicast source address; and send an encapsulated multicast packet to the layer 3 network; and the VTEP on the multicast receive side is further configured to receive an IGMPv3 packet for joining VM multicast and sent by a second VM managed by the VTEP on the multicast receive side, where the IGMPv3 packet carries the VM multicast address and the VM multicast source address; when determining that the second VM matches the VM tenant identifier, modify, according to the mapping relationship between the VM multicast address and the multicast address on the layer 3 network, the VM multicast address in the IGMPv3 packet into the multicast address on the layer 3 network, and modify, according to the mapping relationship between the VM multicast source address and the layer 3 network multicast source address, the multicast source address in the IGMPv3 packet into the multicast source address on the layer 3 network; and send a modified IGMPv3 packet to the layer 3 network.

Optionally, the VTEP on the multicast source side is further configured to receive a multicast data packet sent by the first VM managed by the VTEP on the multicast source side; when performing VXLAN encapsulation on the multicast data packet after determining that the first VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the layer 3 network multicast source address; and send an encapsulated multicast data packet to the layer 3 network; and the VTEP on the multicast receive side is further configured to receive the multicast data packet sent by the VTEP on the multicast receive side using the layer 3 network, where a source address of the multicast data packet is the multicast source address on the layer 3 network, and a destination address is the multicast address on the layer 3 network; decapsulate, according to the configuration information, the multicast data packet to acquire data in the multicast data packet; and send the data in the multicast data packet to the second VM.

Optionally, the VTEP on the multicast source side is further configured to, when a multicast service ends, receive a deletion command for the configuration information and sent by the management layer, and delete the configuration information according to the deletion command; and the VTEP on the multicast receive side is further configured to, when the multicast service ends, receive the deletion command for the configuration information and sent by the management layer, and delete the configuration information according to the deletion command.

In the embodiments of the present disclosure, the technical solutions provided in the present disclosure have an advantage of correctly selecting a multicast source.

DESCRIPTION OF EMBODIMENTS

To make the objectives, technical solutions, and advantages of the present disclosure clearer, the following further describes the present disclosure in detail with reference to the accompanying drawings and the embodiments. It should be understood that the described specific embodiments are merely intended for describing the present disclosure other than limiting the present disclosure.

Figure 1:
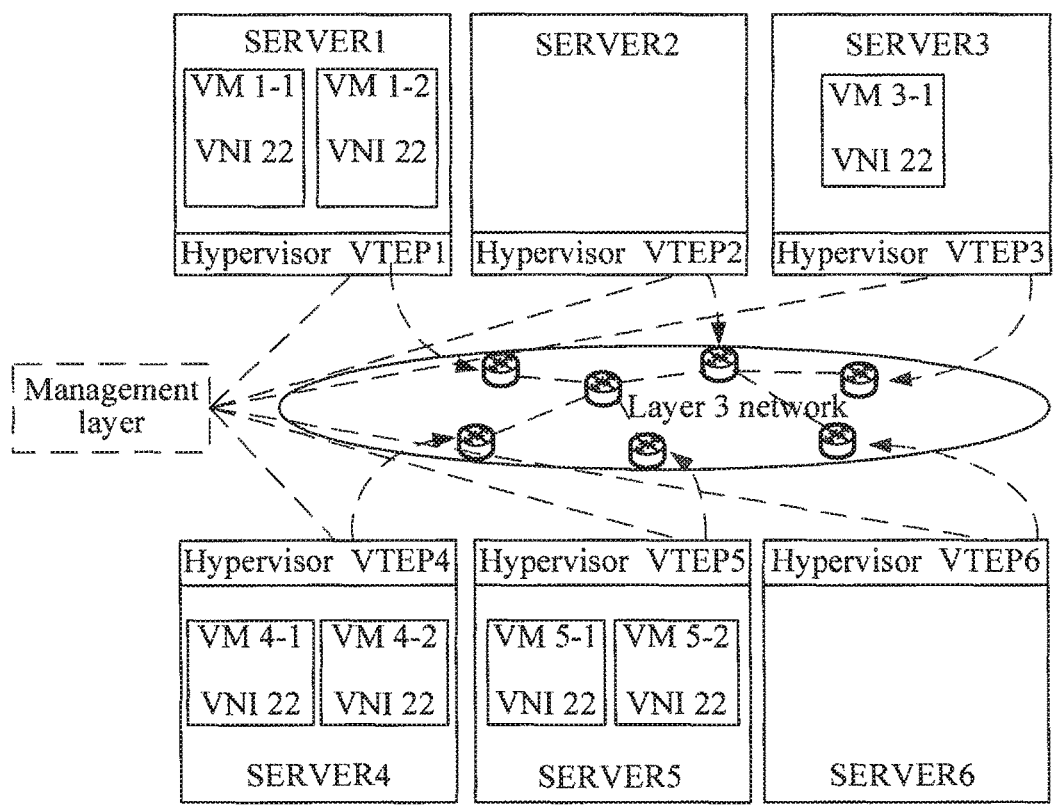
FIG. 1 is a diagram of a networking structure of a VXLAN according to the prior art.
Figure 2:
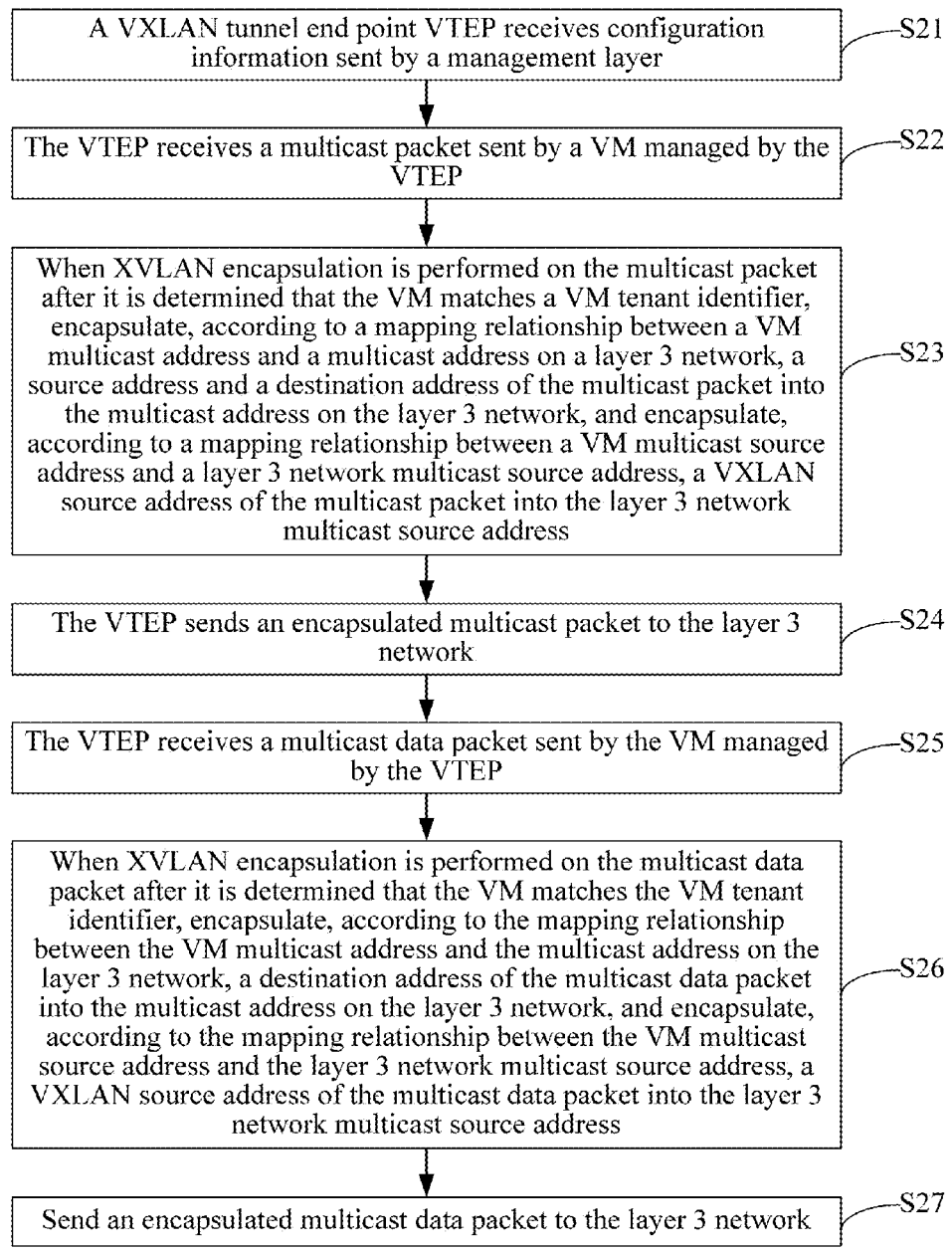
FIG. 2 is a flowchart of a multicast processing method on a VXLAN according to a specific implementation manner of the present disclosure.

A specific implementation manner of the present disclosure provides a multicast processing method on a VXLAN. As shown in FIG. 2, the method includes the following steps:

S21. A VXLAN tunnel end point VTEP receives configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address.

S22. The VTEP receives a multicast packet sent by a VM managed by the VTEP.

S23. When VXLAN encapsulation is performed on the multicast packet after it is determined that the VM matches the VM tenant identifier, encapsulate, according to the mapping relationship between the VM multicast address and the multicast address on the layer 3 network, a destination address of the multicast packet into the multicast address on the layer 3 network, and encapsulate, according to the mapping relationship between the VM multicast source address and the layer 3 network multicast source address, a VXLAN source address of the multicast packet into the layer 3 network multicast source address.

S24. The VTEP sends an encapsulated multicast packet to the layer 3 network.

S25. The VTEP receives a multicast data packet sent by the VM managed by the VTEP.

S26. When VXLAN encapsulation is performed on the multicast data packet after it is determined that the VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the layer 3 network multicast source address.

S27. Send an encapsulated multicast data packet to the layer 3 network.

It should be noted that S25 to S27 in the foregoing method are optional steps, and S25 to S27 belong to operations of data transmission in a VXLAN environment while S21 to S24 belong to operations of control signaling in the VXLAN environment.

In the method provided in this specific implementation manner of the present disclosure, when receiving a multicast packet sent by a VM, a VTEP replaces, according to configuration information, a VM multicast address and a VM multicast source address of the multicast packet with a multicast group address on a layer 3 network and a multicast source address on the layer 3 network. In this way, the layer 3 network differentiates, according to the configuration information, the VM (on a multicast source side) corresponding to the multicast source address and the multicast address on the layer 3 network. When a VM on a multicast receive side sends an IGMPv3 packet (carrying a VM multicast source selected by the VM on the receive side) for joining VM multicast, a VTEP on the multicast receive side modifies, according to the configuration information, a destination address of the IGMPv3 packet into a layer 3 multicast address and multicast source address, and sends the IGMPv3 packet to the layer 3 network. In this way, the layer 3 network can make the VM on the multicast source side correspond to a VM on a multicast joining side. For example, the layer 3 network receives a multicast data packet sent on the multicast source side, and sends the multicast data packet to the VTEP. Then, the VTEP can determine, according to the configuration information, whether the multicast data packet belongs to a VM managed by the VTEP; if yes, decapsulates the multicast data packet and then sends a decapsulated packet; and if not, directly discards the multicast data packet. In this way, a multicast client on a VXLAN can select a multicast source, thereby achieving an objective of correctly selecting a multicast source.

Optionally, after S27, the foregoing method may further include, when a multicast service ends, receiving, by the VTEP, a deletion command for the configuration information and sent by the management layer, and deleting the configuration information according to the deletion command.

Optionally, the foregoing specific method for determining whether the VM matches the VM tenant identifier may be determining whether the VM matches an operator that corresponds to the VM tenant identifier; if the VM matches the operator, determining that the VM matches the VM tenant identifier; and otherwise, determining that the VM does not match the VM tenant identifier.

The VM tenant identifier here may be a China Mobile VM tenant identifier or a China Unicom VM tenant identifier. The VTEP can learn whether the VM matches the VM tenant identifier by determining whether the VM belongs to China Unicom or China Mobile.

Figure 3:
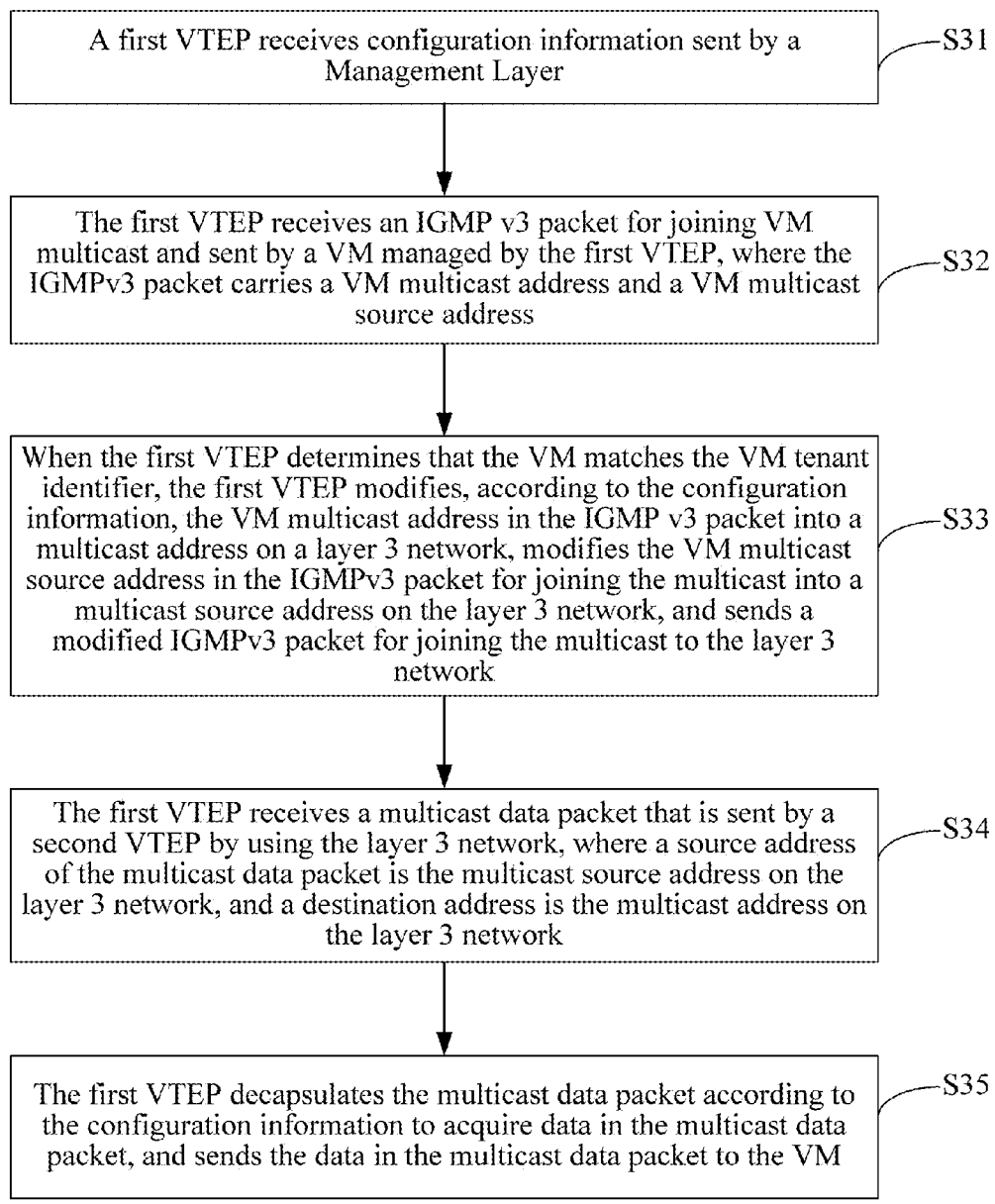
FIG. 3 is a flowchart of a multicast processing method on a VXLAN according to a specific implementation manner of the present disclosure.

An embodiment of the present disclosure provides a multicast processing method in a VXLAN environment. As shown in FIG. 3, the method includes the following steps:

S31. A first VTEP receives configuration information sent by a Management Layer, where the configuration information includes a VM tenant identifier, a mapping relationship between a VM multicast address and a multicast address on a layer 3 network, and a mapping relationship between a VM multicast source address and a layer 3 network multicast source address.

S32. The first VTEP receives an IGMPv3 packet for joining VM multicast and sent by a VM managed by the first VTEP, where the IGMPv3 packet carries the VM multicast address and the VM multicast source address.

S33. When the first VTEP determines that the VM matches the VM tenant identifier (if the first VTEP determines that the VM does not match the VM tenant identifier, directly discard the IGMPv3 packet), the first VTEP modifies, according to the configuration information, the VM multicast address in the IGMPv3 packet into the multicast address on the layer 3 network, modifies the VM multicast source address in the IGMPv3 packet into the multicast source address on the layer 3 network, and sends a modified IGMPv3 packet to the layer 3 network.

S34. The first VTEP receives a multicast data packet that is sent by a second VTEP (there may be multiple second VTEPs herein, but only one is used as an example for description here) using the layer 3 network, where a source address of the multicast data packet is the multicast source address on the layer 3 network, and a destination address is the multicast address on the layer 3 network.

S35. The first VTEP decapsulates the multicast data packet according to the configuration information to acquire data in the multicast data packet, and sends the data in the multicast data packet to the VM.

After receiving the multicast data packet that is sent by the second VTEP using the layer 3 network, the first VTEP determines whether any VM managed by the first VTEP requested the multicast data packet; if yes, decapsulates the multicast data packet according to the configuration information to acquire the data in the multicast data packet, and sends the data in the multicast data packet to a VM tenant who requests the multicast data packet; and if not, discards the multicast data packet.

The first VTEP and the second VTEP may be integrated on a server, a switch or a router.

According to the method provided in this specific implementation manner of the present disclosure, when a first VTEP receives an IGMPv3 packet (carrying a VM multicast source selected by the VM on the receive side) for joining VM multicast and sent by a VM on a multicast receive side, the first VTEP modifies, according to configuration information, a destination address of the IGMPv3 packet into a layer 3 multicast address and multicast source address, and sends the IGMPv3 packet to a layer 3 network. In this way, the layer 3 network can make a VM on a multicast source side correspond to a VM on a multicast joining side. For example, the layer 3 network receives a multicast data packet sent on the multicast source side, and sends the multicast data packet to the first VTEP. Then, the first VTEP can determine, according to the configuration information, whether the multicast data packet belongs to a VM managed by the first VTEP; if yes, decapsulates the multicast data packet and then sends a decapsulated packet; and if not, directly discards the multicast data packet. In this way, a corresponding multicast client on a VXLAN can select a multicast source, thereby achieving an objective of correctly selecting a multicast source.

Optionally, after S35, the foregoing method may further include, after the multicast ends, receiving a deletion command for the foregoing configuration information and sent by the Management Layer, and deleting the foregoing configuration information according to the deletion command.

Figure 4:
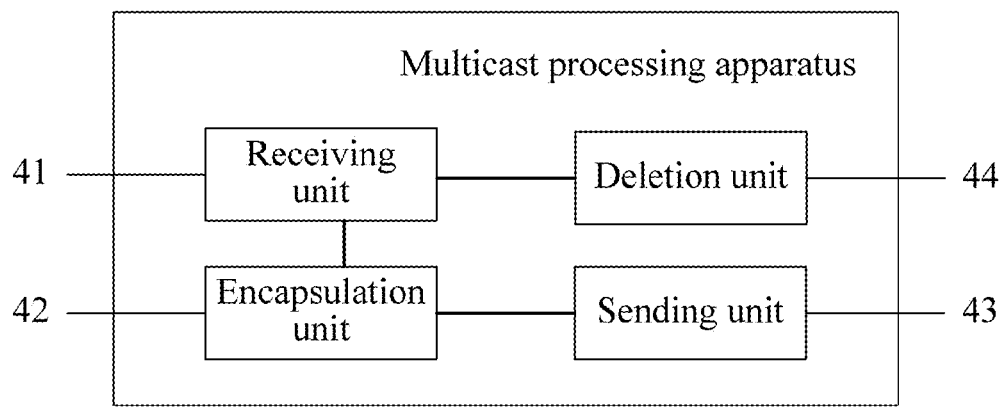
FIG. 4 is a structural diagram of a multicast processing apparatus according to a specific implementation manner of the present disclosure.

A specific implementation manner of the present disclosure further provides a multicast processing apparatus. As shown in FIG. 4, the multicast processing apparatus includes a receiving unit 41 configured to receive configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address; where the receiving unit 41 is further configured to receive a multicast packet sent by a VM managed by the multicast processing apparatus; and an encapsulation unit 42 configured to, when performing VXLAN encapsulation on the multicast packet after determining that the VM matches the VM tenant identifier, encapsulate, according to the mapping relationship between the VM multicast address and the multicast address on the layer 3 network and acquired from the receiving unit 41, a destination address of the multicast packet into the multicast address on the layer 3 network, and encapsulate, according to the mapping relationship between the VM multicast source address and the layer 3 network multicast source address and acquired from the receiving unit 41, a VXLAN source address of the multicast packet into the layer 3 network multicast source address; and a sending unit 43 configured to send, to the layer 3 network, an encapsulated multicast packet acquired from the encapsulation unit 42.

When receiving a multicast packet sent by a VM, the multicast processing apparatus provided in this specific implementation manner of the present disclosure replaces, according to configuration information, a VM multicast address and a VM multicast source address of the multicast packet with a multicast group address on a layer 3 network and a multicast source address on the layer 3 network. In this way, the layer 3 network differentiates, according to the configuration information, the VM (on a multicast source side) corresponding to the multicast source address and the multicast address on the layer 3 network. When a VM on a multicast receive side sends an IGMPv3 packet for joining VM multicast (that is, sends a source selection request), a VTEP on the multicast receive side modifies, according to the configuration information, a destination address of the IGMPv3 packet into a layer 3 multicast address and multicast source address, and sends the IGMPv3 packet to the layer 3 network. In this way, the layer 3 network can make the VM on the multicast source side correspond to a VM on a multicast joining side. For example, the layer 3 network receives a multicast data packet sent on the multicast source side, and sends the multicast data packet to the multicast processing apparatus, and therefore, the multicast processing apparatus can determine, according to the configuration information, whether the multicast data packet belongs to a VM managed by the multicast processing apparatus. If yes, the multicast data packet is sent after decapsulation, and if not, the multicast data packet is directly discarded. In this way, a corresponding multicast client on a VXLAN can select a multicast source, thereby achieving an objective of correctly selecting a multicast source.

Optionally, the receiving unit 41 is further configured to receive a multicast data packet sent by the VM managed by the multicast processing apparatus; the encapsulation unit 42 is further configured to, when performing VXLAN encapsulation on the multicast data packet after determining that the VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the layer 3 network multicast source address; and the sending unit 43 is further configured to send, to the layer 3 network, an encapsulated multicast data packet acquired from the encapsulation unit 42.

Optionally, the foregoing multicast processing apparatus may further include a deletion unit 44 configured to, when a multicast service ends, receive a deletion command for the configuration information and sent by the management layer, and delete the configuration information according to the deletion command.

Figure 5:
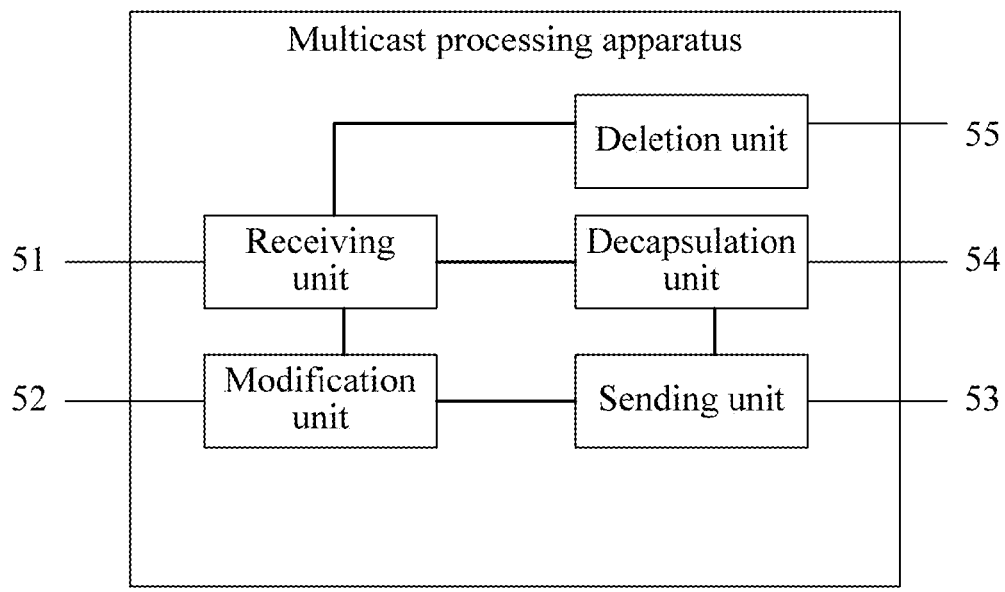
FIG. 5 is a structural diagram of another multicast processing apparatus according to a specific implementation manner of the present disclosure.

A specific implementation manner of the present disclosure further provides another multicast processing apparatus. As shown in FIG. 5, the multicast processing apparatus includes a receiving unit 51 configured to receive configuration information sent by a management layer, where the configuration information includes a VM tenant identifier, a mapping relationship between a VM multicast address and a multicast address on a layer 3 network, and a mapping relationship between a VM multicast source address and a layer 3 network multicast source address; where the receiving unit 51 is further configured to receive an IGMPv3 packet for joining VM multicast and sent by a VM managed by the multicast processing apparatus, where the IGMPv3 packet carries the VM multicast address and the VM multicast source address; a modification unit 52 configured to, when determining that the VM matches the VM tenant identifier, modify, according to the mapping relationship between the VM multicast address and the multicast address on the layer 3 network and acquired from the receiving unit 51, the VM multicast address in the IGMPv3 packet into the multicast address on the layer 3 network, and modify, according to the mapping relationship between the VM multicast source address and the layer 3 network multicast source address and acquired from the receiving unit 51, the multicast source address in the IGMPv3 packet into the multicast source address on the layer 3 network; and a sending unit 53 configured to send, to the layer 3 network, a modified IGMPv3 packet acquired from the modification unit 52.

When the multicast processing apparatus provided in this specific implementation manner of the present disclosure receives an IGMPv3 packet for joining VM multicast sent by a VM on a multicast receive side (that is, sending a source selection request), the multicast processing apparatus modifies, according to configuration information, a destination address of the IGMPv3 packet into a layer 3 multicast address and multicast source address, and sends the IGMPv3 packet to a layer 3 network. In this way, the layer 3 network can make a VM on a multicast source side correspond to a VM on a multicast joining side. For example, the layer 3 network receives a multicast data packet sent on the multicast source side, and sends the multicast data packet to the multicast processing apparatus. Then, the multicast processing apparatus can determine, according to the configuration information, whether the multicast data packet belongs to a VM managed by the multicast processing apparatus; if yes, decapsulates the multicast data packet and then sends a decapsulated packet; and if not, directly discards the multicast data packet. In this way, a corresponding multicast client on a VXLAN can select a multicast source, thereby achieving an objective of correctly selecting a multicast source.

Optionally, the receiving unit 51 is further configured to receive a multicast data packet that is sent by another multicast processing apparatus on the VXLAN using the layer 3 network, where a source address of the multicast data packet is the multicast source address on the layer 3 network, and a destination address is the multicast address on the layer 3 network; the apparatus further comprises a decapsulation unit 54 configured to decapsulate, according to the configuration information, the multicast data packet acquired from the receiving unit 51 to acquire data in the multicast data packet; and the sending unit 53 is further configured to send, to the VM, the data in the multicast data packet and acquired from the decapsulation unit 54.

Optionally, the foregoing multicast processing apparatus may further include a deletion unit 55 configured to, when a multicast service ends, receive a deletion command for the configuration information and sent by the management layer, and delete the configuration information according to the deletion command.

A specific implementation manner of the present disclosure further provides a multicast processing system. The processing system includes a VTEP on a multicast source side, a VTEP on a multicast receive side, and a management layer, where the VTEP on the multicast source side and the VTEP on the multicast receive side are configured to separately receive configuration information sent by the management layer, where the configuration information includes a VM tenant identifier, a mapping relationship between a VM multicast address and a multicast address on a layer 3 network, and a mapping relationship between a VM multicast source address and a layer 3 network multicast source address; the VTEP on the multicast source side is further configured to receive a multicast packet sent by a first VM managed by the VTEP on the multicast source side; when performing VXLAN encapsulation on the multicast packet after determining that the first VM matches the VM tenant identifier, encapsulate, according to the mapping relationship between the VM multicast address and the multicast address on the layer 3 network, a destination address of the multicast packet into the multicast address on the layer 3 network, and encapsulate, according to the mapping relationship between the VM multicast source address and the layer 3 network multicast source address, a VXLAN source address of the multicast packet into the multicast source address on the layer 3 network; and send an encapsulated multicast packet to the layer 3 network; and the VTEP on the multicast receive side is further configured to receive an IGMPv3 packet for joining VM multicast and sent by a second VM managed by the VTEP on the multicast receive side, where the IGMPv3 packet carries the VM multicast address and the VM multicast source address; when determining that the second VM matches the VM tenant identifier, modify, according to the mapping relationship between the VM multicast address and the multicast address on the layer 3 network, the VM multicast address in the IGMPv3 packet into the multicast address on the layer 3 network, and modify, according to the mapping relationship between the VM multicast source address and the layer 3 network multicast source address, the multicast source address in the IGMPv3 packet into the multicast source address on the layer 3 network; and send a modified IGMPv3 packet to the layer 3 network.

Optionally, the VTEP on the multicast source side is further configured to receive a multicast data packet sent by the first VM managed by the VTEP on the multicast source side; when performing VXLAN encapsulation on the multicast data packet after determining that the first VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the multicast source address on the layer 3 network; and send an encapsulated multicast data packet to the layer 3 network; and the VTEP on the multicast receive side is further configured to receive the multicast data packet sent by the VTEP on the multicast receive side using the layer 3 network, where a source address of the multicast data packet is the multicast source address on the layer 3 network, and a destination address is the multicast address on the layer 3 network; decapsulate, according to the configuration information, the multicast data packet to acquire data in the multicast data packet; and send the data in the multicast data packet to the second VM.

Optionally, the VTEP on the multicast source side is further configured to, when a multicast service ends, receive a deletion command for the configuration information and sent by the management layer, and delete the configuration information according to the deletion command; and the VTEP on the multicast receive side is further configured to, when the multicast service ends, receive the deletion command for the configuration information and sent by the management layer, and delete the configuration information according to the deletion command.

Figure 6:
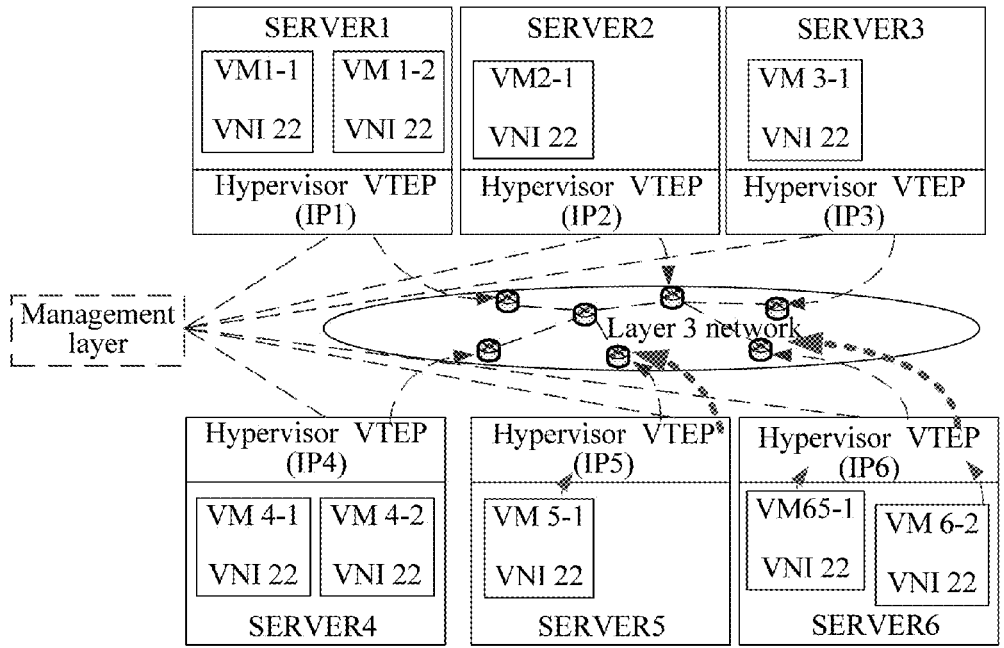
FIG. 6 is a diagram of a networking structure of a VXLAN according to an embodiment of the present disclosure.
Figure 7:
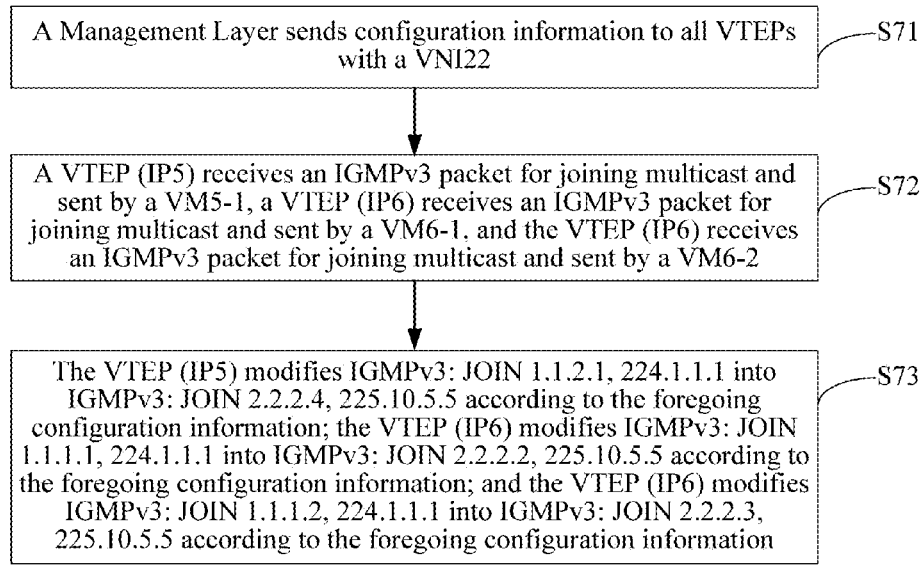
FIG. 7 is a flowchart of a multicast processing method on a VXLAN according to an embodiment of the present disclosure.

An embodiment of the present disclosure provides a method for processing an IGMPv3 packet in a VXLAN environment. FIG. 6 shows a networking scenario of the method, where all VMs shown in FIG. 6 belong to a VNI22. Certainly, in an actual case, the foregoing VNI22 may also be changed into another VNI, for example, a VNI 21. As shown in FIG. 4, a VM1-1 and a VM1-2 are two different multicast sources with a multicast address of 224.1.1.1 (the multicast address herein is only used as an example for ease of description, which may also be another multicast address in an actual case) and are both on a SERVER1. The VM1-1 sends a multicast packet of which (S, G)=(1.1.1.1, 224.1.1.1), and the VM1-2 sends a multicast packet of which (S, G)=(1.1.1.2, 224.1.1.1); in addition, there is another multicast source VM2-1 with a multicast group address of 224.1.1.1 on a SERVER2, which sends a multicast packet of which (S, G)=(1.1.2.1, 224.1.1.1). As described above, all the three VMs send a multicast packet with the multicast address of 224.1.1.1, where the VM1-1 and the VM1-2 are located on the same SERVER1. A VM5-1, a VM6-1 and a VM6-2 in this embodiment need to join a multicast group 224.1.1.1, but the VM5-1 needs to join a multicast group with a multicast source of 1.1.2.1, the VM6-1 needs to join a multicast group with a multicast source of 1.1.1.1, and the VM6-2 needs to join a multicast group with a multicast source of 1.1.1.2. As shown in FIG. 7, a method provided in this embodiment includes the following steps:

S71. A Management Layer sends configuration information to all VTEPs with the VNI22.

The foregoing configuration information may be:
"VNI22: (1.1.1.1, 224.1.1.1)<->(2.2.2.2, 225.10.5.5)"
"VNI22: (1.1.1.2, 224.1.1.1)<->(2.2.2.3, 225.10.5.5)"
"VNI22: (1.1.2.1, 224.1.1.1)<->(2.2.2.4, 225.10.5.5)"

where 1.1.1.1 represents a multicast source address of the VM1-1; 1.1.1.2 represents a multicast source address of the VM1-2; 1.1.2.1 represents a multicast source address of the VM2-1; 224.1.1.1 represents a VM multicast address; <-> represents a mapping relationship; 225.10.5.5 represents a multicast address, to which the VM multicast address 224.1.1.1 is mapped, on a layer 3 network; 2.2.2.2 represents a multicast source address, to which the multicast source address 1.1.1.1 of the VM1-1 is mapped, on the layer 3 network; 2.2.2.3 represents a multicast source address, to which the multicast source address 1.1.1.2 of the VM1-2 is mapped, on the layer 3 network; and 2.2.2.4 represents a multicast source address, to which the multicast source address 1.1.2.1 of the VM2-1 is mapped, on the layer 3 network.

S72. A VTEP (IP5) receives an IGMPv3 packet (a VM multicast source address included in the packet is 1.1.2.1, and a VM multicast group address is 224.1.1.1) for joining multicast and sent by the VM5-1, a VTEP (IP6) receives an IGMPv3 packet (a VM multicast source address is 1.1.1.1, and a VM multicast address is 224.1.1.1) for joining multicast and sent by the VM6-1, and the VTEP (IP6) receives an IGMPv3 packet (a VM multicast source address is 1.1.1.2, and a VM multicast address is 224.1.1.1) for joining multicast and sent by the VM6-2.

It should be noted that specific formats of the foregoing IGMPv3 packets for joining the multicast are as follows:
"VM5-1: IGMPv3: JOIN 1.1.2.1, 224.1.1.1"
"VM6-1: IGMPv3: JOIN 1.1.1.1, 224.1.1.1"
"VM6-2: IGMPv3: JOIN 1.1.1.2, 224.1.1.1"

S73. The VTEP (IP5) modifies IGMPv3: JOIN 1.1.2.1, 224.1.1.1 into IGMPv3: JOIN 2.2.2.4, 225.10.5.5 according to the foregoing configuration information; the VTEP (IP6) modifies IGMPv3: JOIN 1.1.1.1, 224.1.1.1 into IGMPv3: JOIN 2.2.2.2, 225.10.5.5 according to the foregoing configuration information; and the VTEP (IP6) modifies IGMPv3: JOIN 1.1.1.2, 224.1.1.1 into IGMPv3: JOIN 2.2.2.3, 225.10.5.5 according to the foregoing configuration information.

After a VM provided in the embodiment of the present disclosure sends an IGMPv3 packet for joining multicast to a VTEP and joins the multicast, for the IGMPv3 packet for joining the multicast, the VTEP modifies, according to configuration information, a VM multicast address and a VM multicast source address of the IGMPv3 packet and sends a modified IGMPv3 packet to a layer 3 network, and therefore, the layer 3 network learns a multicast source of which the VTEP requests joining. When receiving a multicast packet of the corresponding multicast source, the layer 3 network sends the multicast packet to the corresponding VTEP, the VTEP decapsulates a VXLAN encapsulation of the multicast packet according to a condition of managed VMs and sends a decapsulated multicast packet to a corresponding VM. In this way, a corresponding multicast client in the VXLAN can select a multicast source, thereby achieving an objective of correctly selecting a multicast source.

The modules or units included in the unit and system embodiments are divided merely by function logic, and may be divided in other manners, as long as corresponding functions can be achieved; moreover, specific names of the functional modules are merely used to distinguish between them, and are not intended to limit the protection scope of the present disclosure.

A person skilled in the art may understand that all or a part of the steps of the technical solutions in the embodiments of the present disclosure may be implemented by a program instructing relevant hardware, for example, by running a computer program. The program may be stored in a readable storage medium, such as a random access memory, a magnetic disk, or an optical disc.

The foregoing descriptions are merely exemplary embodiments of the present disclosure, but are not intended to limit the present disclosure. Any modification, equivalent replacement, and improvement made without departing from the principle of the present disclosure should fall within the protection scope of the present disclosure.

What is claimed is:

1. A multicast processing method comprising:
receiving, by a Virtual eXtensible Local Area Network (VXLAN) tunnel end point (VTEP), configuration information sent by a management layer, wherein the configuration information comprises a virtual machine (VM) tenant identifier, a mapping relationship between a VM multicast address and a multicast address on a layer 3 network, and a mapping relationship between a VM multicast source address and a layer 3 network multicast source address;
receiving, by the VTEP, a multicast packet sent by a VM managed by the VTEP; and
when performing VXLAN encapsulation on the multicast packet after determining that the VM matches the VM tenant identifier, encapsulating, according to the mapping relationship between the VM multicast address and the multicast address on the layer 3 network, a destination address of the multicast packet into the multicast address on the layer 3 network, and encapsulating, according to the mapping relationship between the VM multicast source address and the layer 3 network multicast source address, a VXLAN source address of the multicast packet into the layer 3 network multicast source address; and
sending an encapsulated multicast packet to the layer 3 network.

2. The method according to claim 1 further comprising:
receiving, by the VTEP, a multicast data packet sent by the VM managed by the VTEP;

when performing VXLAN encapsulation on the multicast data packet after determining that the VM matches the VM tenant identifier, encapsulating, according to the mapping relationship between the VM multicast address and the multicast address on the layer 3 network, a destination address of the multicast data packet into the multicast address on the layer 3 network, and encapsulating, according to the mapping relationship between the VM multicast source address and the layer 3 network multicast source address, a VXLAN source address of the multicast data packet into the layer 3 network multicast source address; and sending an encapsulated multicast data packet to the layer 3 network.

3. The method according to claim 1, wherein, after sending the encapsulated multicast data packet to the layer 3 network, the method further comprises:
   receiving, by the VTEP, a deletion command for the configuration information and sent by the management layer when a multicast service ends; and
   deleting the configuration information according to the deletion command.

4. A multicast processing method comprising:
   receiving, by a Virtual eXtensible Local Area Network (VXLAN) tunnel end point (VTEP), configuration information sent by a management layer, wherein the configuration information comprises a virtual machine (VM) tenant identifier, a mapping relationship between a VM multicast address and a multicast address on a layer 3 network, and a mapping relationship between a VM multicast source address and a layer 3 network multicast source address;
   receiving, by the VTEP, an Internet Group Management Protocol version 3 (IGMPv3) packet for joining VM multicast and sent by a VM managed by the VTEP, wherein the IGMPv3 packet carries the VM multi cast address and the VM multicast source address; and
   when the VTEP determines that the VM matches the VM tenant identifier, modifying, according to the mapping relationship between the VM multicast address and the multicast address on the layer 3 network, the VM multicast address in the IGMPv3 packet into the multicast address on the layer 3 network, modifying, according to the mapping relationship between the VM multicast source address and the layer 3 network multicast source address, the multicast source address in the IGMPv3 packet into the multicast source address on the layer 3 network, and sending a modified IGMPv3 packet to the layer 3 network.

5. The method according to claim 4 further comprising:
   receiving, by the VTEP, a multicast data packet that is sent by another VTEP on the VXLAN using the layer 3 network, wherein a source address of the multicast data packet is the multicast source address on the layer 3 network, and wherein a destination address is the multicast address on the layer 3 network;
   decapsulating, by the VTEP according to the configuration information, the multicast data packet to acquire data in the multicast data packet; and
   sending the data in the multicast data packet to the VM.

6. The method according to claim 4, wherein, after sending the data in the multicast data packet to the VM, the method further comprises:
   receiving, by the VTEP, a deletion command for the configuration information and sent by the management layer when a multicast service ends; and deleting the configuration information according to the deletion command.

7. A multicast processing apparatus comprising:
   a receiver configured to:
      receive configuration information sent by a management layer, wherein the configuration information comprises a virtual machine (VM) tenant identifier, a mapping relationship between a VM multicast address and a multicast address on a layer 3 network, and a mapping relationship between a VM multicast source address and a layer 3 network multicast source address; and
      receive a multicast packet sent by a VM managed by the multicast processing apparatus;
   a processor coupled to the receiver and configured to:
      when performing Virtual eXtensible Local Area Network (VXLAN) encapsulation on the multicast packet after determining that the VM matches the VM tenant identifier, encapsulate, according to the mapping relationship between the VM multicast address and the multicast address on the layer 3 network and acquired from the receiver, a destination address of the multicast packet into the multicast address on the layer 3 network, and encapsulate, according to the mapping relationship between the VM multicast source address and the layer 3 network multicast source address and acquired from the receiver, a VXLAN source address of the layer 3 network multicast packet into the multicast source address; and
   a transmitter coupled to the processor and configured to send, to the layer 3 network, an encapsulated multicast packet acquired from the encapsulation unit.

8. The apparatus according to claim 7, wherein the receiver is further configured to receive a multicast data packet sent by the VM managed by the multicast processing apparatus, wherein the processor is further configured to:
   when performing VXLAN encapsulation on the multicast data packet after determining that the VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the layer 3 network multicast source address, and
   wherein the transmitter is further configured to send, to the layer 3 network, an encapsulated multicast data packet acquired from the processor.

9. The apparatus according to claim 8, wherein the processor is further configured to:
   receive a deletion command for the configuration information and sent by the management layer when a multicast service ends; and
   delete the configuration information according to the deletion command.

10. A multicast processing apparatus comprising:
    a receiver configured to:
       receive configuration information sent by a management layer, wherein the configuration information comprises a virtual machine (VM) tenant identifier, a mapping relationship between a VM multicast address and a multicast address on a layer 3 network, and a mapping relationship between a VM multicast source address and a layer 3 network multicast source address; and receive an Internet Group Management Protocol version 3 (IGMPv3) packet for joining VM multicast and sent by a VM managed by the multicast processing apparatus, wherein the IGMPv3 packet carries the VM multicast address and the VM multicast source address;

a processor coupled to the receiver and configured to:
when determining that the VM matches the VM tenant identifier, modify, according to the mapping relationship between the VM multicast address and the multicast address on the layer 3 network and acquired from the receiver, the VM multicast address in the IGMPv3 packet into the multicast address on the layer 3 network, and modify, according to the mapping relationship between the VM multicast source address and the layer 3 network multicast source address and acquired from the receiver, the multicast source address in the IGMPv3 packet into the multicast source address on the layer 3 network; and a transmitter coupled to the processor and configured to send, a modified IGMPv3 packet acquired from the processor to the layer 3 network.

11. The apparatus according to claim 10, wherein the receiver is further configured to receive a multicast data packet that is sent by another multicast processing apparatus on a Virtual eXtensible Local Area Network (VXLAN) using the layer 3 network, wherein a source address of the multicast data packet is the multicast source address on the layer 3 network, and wherein a destination address is the multicast address on the layer 3 network, wherein the processor is further configured to decapsulate, according to the configuration information, the multicast data packet acquired from the receiver to acquire data in the multicast data packet, and wherein the transmitter is further configured to send, to the VM, the data in the multicast data packet and acquired from the decapsulation unit.

12. The apparatus according to claim 11, wherein the processor is further configured to:
receive a deletion command for the configuration information and sent by the management layer when a multicast service ends; and
delete the configuration information according to the deletion command.

13. A multicast processing system comprising:
a Virtual eXtensible Local Area Network (VXLAN) tunnel end point (VTEP) on a multicast source side;
a VTEP on a multicast receive side; and
a management layer, wherein the VTEP on the multicast source side and the VTEP on the multicast receive side are configured to separately receive configuration information sent by the management layer, wherein the configuration information comprises a virtual machine (VM) tenant identifier, a mapping relationship between a VM multicast address and a multicast address on a layer 3 network, and a mapping relationship between a VM multicast source address and a layer 3 network multicast source address,
wherein the VTEP on the multicast source side is further configured to:
receive a multicast packet sent by a first VM managed by the VTEP on the multicast source side; and
when performing VXLAN encapsulation on the multicast packet after determining that the first VM matches the VM tenant identifier, encapsulate, according to the mapping relationship between the VM multicast address and the multicast address on the layer 3 network, a destination address of the multicast packet into the multicast address on the layer 3 network, and encapsulate, according to the mapping relationship between the VM multicast source address and the layer 3 network multicast source address, a VXLAN source address of the multicast packet into the layer 3 network multicast source address; and send an encapsulated multicast packet to the layer 3 network, and wherein the VTEP on the multicast receive side is further configured to:
receive an Internet Group Management Protocol version 3 (IGMPv3) packet for joining VM multicast and sent by a second VM managed by the VTEP on the multicast receive side, wherein the IGMPv3 packet carries the VM multicast address and the VM multicast source address; and when determining that the second VM matches the VM tenant identifier, modify, according to the mapping relationship between the VM multicast address and the multicast address on the layer 3 network, the VM multicast address in the IGMPv3 packet into the multicast address on the layer 3 network, and modify, according to the mapping relationship between the VM multicast source address and the layer 3 network multicast source address, the multicast source address in the IGMPv3 packet into the multicast source address on the layer 3 network; and send a modified IGMPv3 packet to the layer 3 network.

14. The system according to claim 13, wherein the VTEP on the multicast source side is further configured to: receive a multicast data packet sent by the first VM managed by the VTEP on the multicast source side; when performing VXLAN encapsulation on the multicast data packet after determining that the first VM matches the VM tenant identifier, encapsulate, according to the mapping relationship between the VM multicast address and the multicast address on the layer 3 network, a destination address of the multicast data packet into the multicast address on the layer 3 network, and encapsulate, according to the mapping relationship between the VM multicast source address and the layer 3 network multicast source address, a VXLAN source address of the multicast data packet into the layer 3 network multicast source address; and send an encapsulated multicast data packet to the layer 3 network, and wherein the VTEP on the multicast receive side is further configured to receive the multicast data packet sent by the VTEP on the multicast receive side using the layer 3 network, wherein a source address of the multicast data packet is the multicast source address on the layer 3 network, and a destination address is the multicast address on the layer 3 network; decapsulate, according to the configuration information, the multicast data packet to acquire data in the multicast data packet; and send the data in the multicast data packet to the second VM.

15. The system according to claim 14, wherein the VTEP on the multicast source side is further configured to:
receive a deletion command for the configuration information and sent by the management layer when a multicast service ends; and
delete the configuration information according to the deletion command, and wherein the VTEP on the multicast receive side is further configured to:
receive the deletion command for the configuration information and sent by the management layer when the multicast service ends; and
delete the configuration information according to the deletion command.

* * * * *